(12) United States Patent
Andoh

(10) Patent No.: US 8,818,559 B2
(45) Date of Patent: Aug. 26, 2014

(54) ROBOT APPARATUS AND CONTROL METHOD THEREFOR

(75) Inventor: Fukashi Andoh, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 532 days.

(21) Appl. No.: 13/255,775

(22) PCT Filed: Mar. 10, 2010

(86) PCT No.: PCT/IB2010/000574
§ 371 (c)(1),
(2), (4) Date: Sep. 9, 2011

(87) PCT Pub. No.: WO2010/103399
PCT Pub. Date: Sep. 16, 2010

(65) Prior Publication Data
US 2012/0004775 A1    Jan. 5, 2012

(30) Foreign Application Priority Data

Mar. 11, 2009  (JP) ................................. 2009-058334

(51) Int. Cl.
*G05B 19/00* (2006.01)
*B25J 9/06* (2006.01)
*B25J 9/16* (2006.01)

(52) U.S. Cl.
CPC . *B25J 9/06* (2013.01); *B25J 9/1607* (2013.01); *B25J 9/1615* (2013.01); *B25J 9/1633* (2013.01); *B25J 9/1643* (2013.01)
USPC ....................................................... 700/261

(58) Field of Classification Search
CPC .............. B25J 3/00; B25J 9/06; B25J 9/1607; B25J 9/1615; B25J 9/1633; B25J 9/1635; B25J 9/1643; B25J 9/1664; B25J 19/22
USPC .......... 701/300, 301; 700/245, 250, 260, 261, 700/262, 253
See application file for complete search history.

(56) References Cited

U.S. PATENT DOCUMENTS

| 5,078,140 A | * | 1/1992 | Kwoh ........................... 600/417 |
| 6,684,129 B2 | * | 1/2004 | Salisbury et al. ............. 700/245 |
| 6,714,839 B2 | * | 3/2004 | Salisbury et al. ............. 700/245 |

(Continued)

FOREIGN PATENT DOCUMENTS

| JP | 07-129210 A | 5/1995 |
| JP | 08-257957 A | 10/1996 |

(Continued)

OTHER PUBLICATIONS

International Search Report issued Jul. 15, 2010 in PCT/IB2010/000574 & Written Opinion..

(Continued)

*Primary Examiner* — Thomas Black
*Assistant Examiner* — Sze-Hon Kong
(74) *Attorney, Agent, or Firm* — Kenyon & Kenyon LLP

(57) ABSTRACT

A robot apparatus includes a robot mechanism having a plurality of joints, and actuators that drive joint axes of the robot mechanism. The robot apparatus includes a robot controller that controls the driving of the actuators based on a cost function that is a function of torque reference inputs for the actuators.

16 Claims, 6 Drawing Sheets

(56) References Cited

U.S. PATENT DOCUMENTS

| | | | |
|---|---|---|---|
| 6,786,896 B1* | 9/2004 | Madhani et al. | 606/1 |
| 8,160,743 B2* | 4/2012 | Birkenbach et al. | 700/245 |
| 8,463,433 B2* | 6/2013 | Nagasaka | 700/245 |
| 2002/0104061 A1* | 8/2002 | Xing et al. | 716/4 |

FOREIGN PATENT DOCUMENTS

| | | |
|---|---|---|
| JP | 3283650 A | 3/2002 |
| JP | 2005-193311 A | 7/2005 |
| JP | 2008-073830 A | 4/2008 |
| WO | 00/43167 A1 | 7/2000 |

OTHER PUBLICATIONS

Myoung Rwan Choi: "Redundancy resolution by minimization of joint disturbance torque for independent joint controlled manipulators", Advanced Intelligent Mechatronics< 1999. Proceedings 1999 IEEE/ASME International Conference in Atlanta, GA, USA, Sep. 19-23, 1999, Piscataway, NJ, USA, IEEE, US, Sep. 19, 1999, pp. 392-397.

Ma S Ed—Institute of Electrical and Electronics Engineers: "Local Torque Optimization of Redundant Manipulators in Torque-Based Formulation", Proceedings of the International Conference on Industrial Electronics, Control and Instrumentation, (IECON); Bologna, Sep. 5-9, 1994; Plenary Session Power Electronics; [Proceedings of the International Conference on Industrial Electronics, Contro, vol. 2 of 03, Sep. 5, 1994, pp. 697-702.

Shugen MA: "Local torque minimazation of redundate manipulators with considering end-motion joint velocities", Systems, Man and Cybernetics, 1996, IEEE International conference on BEijing, China, Oct. 14-17, 1996, New York, NY, USA, IEEE, US LNKD—DOI:10.1109/ICSMC.1996.571362, vol. 2, Oct. 14, 1996, pp. 1477-1482.

Fan-Tien Cheng et al.: "The improved compact QP method for resolvingg manipulator redundancy"; Intelligent Robots and Systems '94 . 'Advanced Robotics Systems and the Real World', IROS '94 . Proceedings of the IEEe/RSJ/GI International Conference in Munich, Germany, Sep. 12-16, 1994, New York, NY, USA, IEEE LNKD—DOI:10.1109/IROS.1994.407505, vol. 2, Sep. 12, 1994, pp. 1368-1375.

Office Action issued in Japanese Application No. 2009/058334 issued Dec. 15, 2010 and partial English translation thereof.

Shugen Ma, et al.: Efficient Redundancy Control of Redundant Manipulators, Journal of the Rob Otics Society of Japan, Robotics Society of Japan, vol. 14, No. 5.

Suguru Arimoto, Science of Intelligence: "Intelligence" and "Dexterity" of Robots, First Edition, Corona Publishing Co., Ltd., Tatsumi Gorai, First Edition, pp. 22-31.

Kazuya Yoshida, Coordinated Control of Multiple Manipulators in Space Robots, Journal of the Robotics Society of Japan, Robotics Society of Japan, vol. 9, No. 6.

Teruyuki Izumi: Trajectory Planning for Saving Energy of 3-Link Manipulator, vol. 120-C, No. 5, The Transactions of the Institute of Electrical Engineers of Japan.

* cited by examiner

ROBOT APPARATUS AND CONTROL METHOD THEREFOR

This is a 371 national phase application of PCT/IB2010/000574 filed 10 Mar. 2010, claiming priority to Japanese Patent Application No. 2009-058334 filed 11 Mar. 2009, the contents of which are incorporated herein by reference.

BACKGROUND OF THE INVENTION

1. Field of the Invention

The invention relates to a robot apparatus that includes a robot mechanism that has a plurality of joints, and a plurality of actuators that drive joint axes of the robot mechanism, and to a control method for the robot apparatus. More particularly, the invention relates to a robot apparatus capable of flexibly executing desired motions while restraining the amount of electric power consumption, and to a control method for the robot apparatus.

2. Description of the Related Art

In recent years, in conjunction with a robot apparatus that shares a space of activity with humans, there has arisen a situation in which as the electric power consumption of the robot apparatus has been increased, it has become necessary to frequently charge the battery of the robot apparatus. Besides, there also is a technical issue that when a robot apparatus contacts a person, a thing, or the like around the robot apparatus, the robot apparatus needs to flexibly and safely have the contact and simultaneously execute a desired motion. Thus, there is a need for a control of a robot apparatus which is capable of flexibly executing desired motions of the robot apparatus while restraining the electric power consumption of the robot apparatus.

On the other hand, International Patent Application Publication No. WO 00/43167 discloses a robot apparatus that causes the positions of joint axes of a robot to track a posture transition plan that is provided for transition to the next action which has been calculated based on action reference input information. Besides, Japanese Patent No. 3283650 discloses a robot control apparatus that controls various axes of a robot by changing control gains of a servo-control system based on a designated index of the softness related to the coordinate system that the robot has recognized.

However, with regard to the foregoing robot apparatus shown in International Patent Application Publication NO. WO 00/43167, there is a possibility that, for example, a motion reference input from a user may constrain the motions of various joint axes of the robot more than necessary, and therefore the electric power consumption of the robot may increase and the robot may become unable to flexibly contact obstacles around the robot. Similarly, with regard to the foregoing robot control apparatus shown in Japanese Patent No. 3283650, there is a possibility that motions of axes of the robot may be constrained, and therefore the electric power consumption of the robot may increase, or the robot may fail to execute a motion that satisfies a motion reference input when contacting an obstacle around the robot.

SUMMARY OF THE INVENTION

This invention provides a robot apparatus capable of flexibly executing desired motions while restraining its electric power consumption.

The first aspect of the invention relates to a robot apparatus that includes: a robot mechanism having a plurality of joints; a plurality of actuators that drive joint axes of the robot mechanism; and a robot controller that drives the actuators based on a cost function that is a function of torque reference inputs for the actuators. According to the foregoing construction, the robot apparatus is able to execute desired motions flexibly while restraining the electric power consumption.

In the robot apparatus in accordance with this aspect, the robot controller may have a minimum-of-cost-function computation portion for calculating the minimum of the cost function, and the robot controller may drive the actuators so that the value of the cost function calculated by the minimum-of-cost-function computation portion becomes minimum. Due to this construction, the value of the cost function is minimized, and thus the electric power consumption can be minimized.

Furthermore, the robot apparatus in accordance with this aspect may further include a target motion generator that generates a target motion that represents a desired motion of the robot mechanism, and the minimum-of-cost-function computation portion may classify the plurality of joint axes of the robot mechanism into independent axes and dependent axes that depend on the independent axes based on the target motion generated by the target motion generator, and may calculate the minimum of the cost function that employs only the positions of the independent axes as variables. Due to this construction, it becomes possible to perform flexible control commensurate with the independent axes and the dependent axes. Even when contacting an obstacle around the apparatus, the robot apparatus is able to flexibly and safely contact the obstacle while restraining the electric power consumption.

The robot apparatus in accordance with this aspect may further include a motion environment detector that detects a motion environment of the robot mechanism, and the minimum-of-cost-function computation portion may calculate the minimum of the cost function based on the motion environment detected by the motion environment detector and the target motion generated by the target motion generator. Due to this construction, the robot apparatus is able to calculate the minimum of the cost function by taking into account the motion environment and the target motion of the robot mechanism.

In the robot apparatus in accordance with this aspect, the motion environment detector may detect as the motion environment a constraint condition that satisfies a movable range of the joint axis that is determined by an ambient environment of the robot mechanism, and also satisfies a mechanically limited movable range of the joint axis. Due to this construction, the constraint condition of the robot mechanism can be appropriately set.

The robot apparatus in accordance with this aspect may further include a position sensors that measure positions of the joint axes, and the minimum-of-cost-function computation portion may calculate as independent-axis position reference inputs the positions of the independent axes when the cost function becomes minimum, and the robot controller may further have an individual-axis feedback control portion that calculates independent-axis, torque reference inputs such that the positions of the independent axes from the position sensors converge to the independent-axis position reference inputs calculated by the minimum-of-cost-function computation portion. Due to this construction, the robot apparatus is able to calculate the independent-axis torque reference inputs for controlling the independent axes, and is able to appropriately control the independent axes.

In the robot apparatus in accordance with this aspect, the robot controller may further have an individual-actuator weight computation portion that calculates individual-actuator weights that show relative degrees of importance of the plurality of actuators, and the individual-axis feedback control portion may have an independent-axis control portion that calculates control gains for the independent axes in proportion to the individual-actuator weights calculated by the individual-actuator weight computation portion, and that, using the calculated control gains, calculates the independent-axis torque reference inputs. Due to this construction the robot apparatus is able to set optimum control gains commensurate with the degrees of importance of the independent axes, and therefore is able to optimally control the independent axes.

In the robot apparatus in accordance with this aspect, the individual-axis feedback control portion may further have a dependent-axis position reference input generation portion that calculates a dependent-axis position reference inputs based on the positions of the dependent axes from the position sensors and on the target motion generated by the target motion generator, and may also have a dependent-axis control portion that calculates control gains for the dependent axes in proportion to the individual-actuator weights calculated by the individual-actuator weight computation portion, and that, using the calculated control gains, calculates the dependent-axis torque reference inputs. Due to this construction, the robot apparatus is able to set the optimum control gains commensurate with the degrees of importance of the dependent axes, and is able to optimally control the dependent axes.

In the robot apparatus in accordance with this aspect, the robot controller may further have a torque control portion that drives the actuators based on the independent-axis torque reference inputs calculated by the independent-axis control portion or the dependent-axis torque reference inputs calculated by the dependent-axis control portion. Besides, in the robot apparatus in accordance with this aspect, the cost function may be a sum of squares of torque reference inputs for the actuators.

In the robot apparatus in accordance with this aspect, the minimum-of-cost-function computation portion may calculate the minimum of the cost function by a numerical search method. Due to this construction, the robot apparatus is able to further appropriately calculate the minimum of the cost function with regard to a complicated robot mechanism.

In the robot apparatus in accordance with this aspect, the minimum-of-cost-function computation portion may determine as the minimum of the cost function the smallest value among extrema of the cost function and values at the ends of a predetermined interval of the cost function. Due to this construction, the robot apparatus is able to calculate the minimum of the cost function by a simple process. Besides, in the robot apparatus in accordance with this aspect, the minimum-of-cost-function computation portion may choose as a candidate for the minimum of the cost function a point that provides the smallest value around an initial parameter that is selected using random numbers, and may determine the candidate as the minimum of the cost function. This makes it possible to calculate the minimum of the cost function by a simple process.

In the robot apparatus in accordance with this aspect, the robot controller may drive the actuators so that the actuators move flexibly.

The second aspect of the invention relates to a control method for a robot apparatus that includes a robot mechanism having a plurality of joints, and a plurality of actuators that drive joint axes of the robot mechanism. This control method includes control of the actuators based on a cost function that is a function of torque reference inputs for the actuators. According to this construction, it is possible to flexibly execute desired motions while restraining the electric power consumption.

Besides, in the control method in accordance with this aspect, the control of the actuators may include calculating the minimum of the cost function, and driving the actuators so that the value of the cost function becomes minimum.

Furthermore, the control method in accordance with this aspect may further include generating a target motion that represents a desired motion of the robot mechanism, and the calculation of the minimum of the cost function may include classifying the plurality of joint axes of the robot mechanism into independent axes and dependent axes that depends on the independent axes based on the target motion generated by the target motion generator, and calculating the minimum of the cost function that employs only the positions of the independent axes as variables.

The control method in accordance with this aspect may further include detecting a motion environment of the robot mechanism, and the calculation of the minimum of the cost function may include calculating the minimum of the cost function based on the motion environment detected and the target motion generated.

The control method in accordance with this aspect may further include measuring positions of the joint axes, and the calculation of the minimum of the cost function may include calculating as independent-axis position reference inputs the positions when the cost function takes the minimum, and the control of the actuators may further include calculating independent-axis torque reference inputs such that the positions of the independent axes measured converge to the independent-axis position reference inputs calculated.

In the control method in accordance with this aspect, the control of the actuators may include calculating individual-actuator weights that show relative degrees of importance of the plurality of actuators, and the calculating of the independent-axis torque reference inputs may include calculating control gains for the independent axes in proportion to the individual-actuator weights calculated, and may also include calculating the independent-axis torque reference inputs by using the control gains calculated.

In the control method in accordance with this aspect, the calculation of the independent-axis torque reference inputs may include calculating dependent-axis position reference inputs based on the positions of the dependent axes measured and the target motion generated, and may also include calculating control gains for the dependent axes in proportion to the individual-actuator weights calculated, and calculating dependent-axis torque reference inputs by using the control gains calculated.

In the control method in accordance with this aspect, the actuators may be driven based on the cost function so that the actuators move flexibly.

According to the invention, it is possible to provide a robot apparatus and a control method which are capable of flexibly executing desired motions while restraining the electric power consumption.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
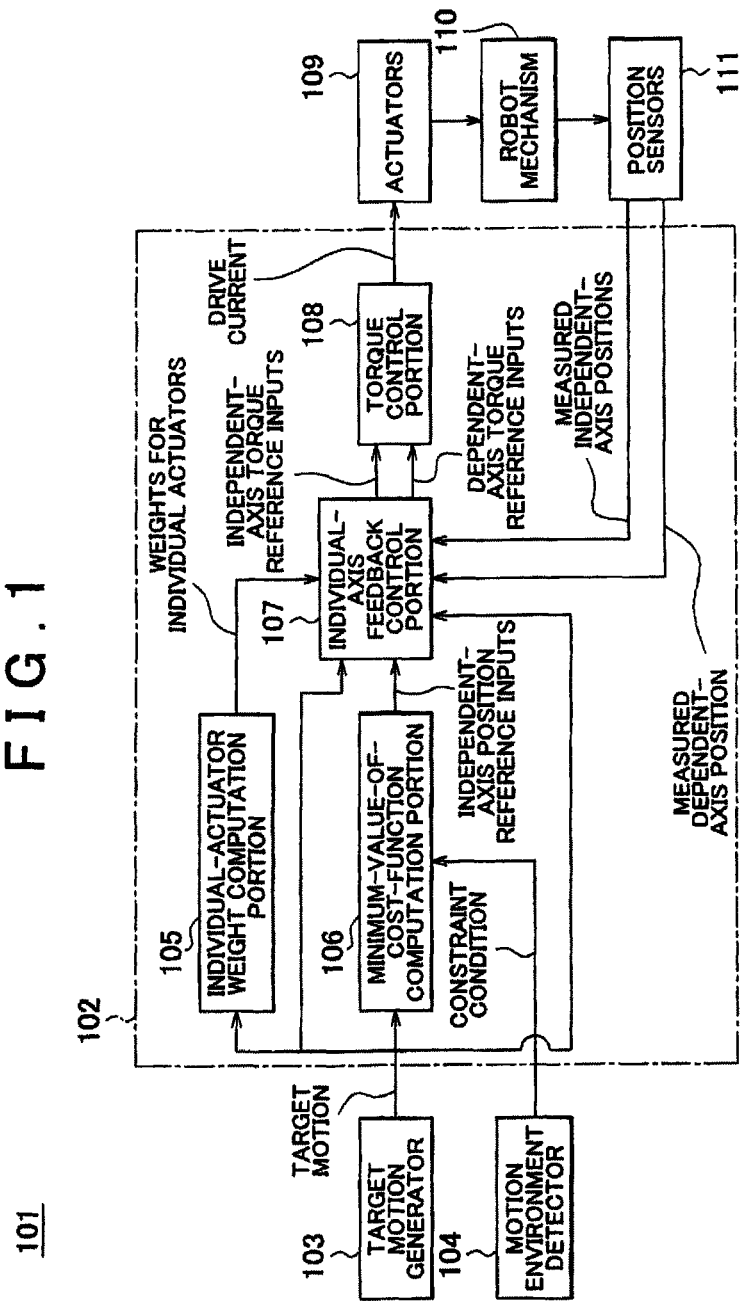
FIG. 1 is a block diagram showing a general system construction of a robot apparatus in accordance with an embodiment of the invention.

Hereinafter, embodiments of the invention will be described with reference to the accompanying drawings. FIG. 1 is a block diagram showing a general system construction of a robot apparatus in accordance with an embodiment of the invention. A robot apparatus 101 in accordance with this embodiment includes: a target motion generator 103, a motion environment detector 104, a plurality of actuators 109, a robot mechanism 110, a plurality of position sensors 111, and a robot controller 102.

The robot mechanism 110 is a movable portion of the robot, such as an arm portion, and a leg portion of the robot having a plurality of pivotable joint axes. Each joint axis is provided with an actuator 109 that rotationally drives the joint axis. Each joint axis is also provided with a position sensor 111 for detecting the position of the joint axis.

The target motion generator 103 generates, a target motion of each joint axis of the robot mechanism 110 which is a constraint equation of joint positions and is used, for example, when the robot apparatus 101 is caused to perform a desired motion. The robot mechanism 110 is, for example, a multi joint type robot arm mechanism that has a plurality of joint axes. In this case, the target motions are relational expressions of the positions (rotation angles) of the joint axes. The target motion generator 103 outputs a generated target motion to a minimum-of-cost-function computation portion 106 of the robot controller 102.

The motion environment detector 104 detects the relative positions of obstacles (a human, a thing, and the like) around the robot mechanism 110, using various sensors such as a visual sensor (a camera, or the like), a proximity sensor. (an ultrasonic sensor, or the like). Based on the relative position of the detected obstacle, the motion environment detector 104 calculates, for example, a movable range $\Omega_e$ of each joint axis such that the robot mechanism 110 will not contact the obstacle. Then, the motion environment detector 104 calculates a final constraint condition $\Omega$ of each joint axis of the robot mechanism 110 based on the movable range $\Omega_e$ calculated for each joint axis of the robot mechanism 110, and a predetermined mechanically limited movable range $\Omega_m$ of each joint axis.

The mechanically limited movable range $\Omega_m$ of a joint axis of the robot mechanism 110 refers to, for example, a range of motion limited by mechanical restrictions of the robot mechanism 110 in which the joint axis is allowed to rotate. The motion environment detector 104 outputs the calculated constraint condition $\Omega$ of each joint axis of the robot mechanism 110 to the minimum-of-cost-function computation portion 106 of the robot controller 102.

The robot controller 102 is able to flexibly control the robot mechanism 110 as described below by controlling the various actuators 109 based on the target motions generated by the target motion generator 103, the constraint condition $\Omega$ of each joint axis of the robot mechanism 110 that is calculated by the motion environment detector 104, and measured signals from the position sensors 111.

Next, a system construction of the robot, controller 102 will be described in detail. The robot controller 102 has an individual-actuator weight computation portion 105, the minimum-of-cost-function computation portion 106, an individual-axis feedback control portion 107, and a torque control portion 108.

The individual-actuator weight computation portion 105 calculates an individual-actuator weight for each actuator 109 according to the level of importance of the motion of a corresponding joint axis caused by the actuator 109. The individual-actuator weights are weight coefficients that show the relative levels of importance of the actuators 109 of the joint axes, in order for the robot apparatus 101 to perform motions that satisfy the target motions generated by the target motion generator 103.

The individual-actuator weight computation portion 105 calculates weights for the individual actuators by, for example, comparing the target motions generated by the target motion generator 103, and a predetermined motion patterns. For example, the individual-actuator weight computation portion 105 calculates relatively high weights for the actuators 109 of joint axes that perform important motions, and calculates relatively low weights for the actuators 109 of joint axes that perform less important motions. The individual-actuator weight computation portion 105 outputs the individual-actuator weights calculated individually for the actuators 109 of the joint axes, to the individual-axis feedback control portion 107.

The minimum-of-cost-function computation portion 106 calculates the minimum of the cost function that satisfies the target motions generated by the target motion generator 103, and also satisfies the constraint conditions $\Omega$ of the individual joint axes calculated by the motion environment detector 104. The minimum-of-cost-function computation portion 106 also calculates the rotational position of independent axes at the time. Incidentally, the cost function is a function for evaluating the amount of electric power consumption of the robot apparatus 101, and is expressed in terms of the torque reference inputs to the actuators 109 of the joint axes. Therefore, for example, by using the minimum of the cost function, the torque reference inputs to the actuator 109 of each joint axis can be minimized so that the amount of electric power consumption of the robot apparatus 101 can be minimized.

The minimum-of-cost-function computation portion 106 classifies the joint axes of the robot mechanism 110 into independent axes and dependent axes that depend on the independent axes, based on the target motions. The independent axes herein are, for example, joint axes that are expressed as independent variables in the function of the target motions. On the other hand, the dependent axes are joint axes that are expressed as dependent variables in the function of the target motions. The minimum-of-cost-function computation portion 106 outputs to the individual-axis feedback control portion 107 the calculated positions of the independent axes as independent-axis position reference inputs.

The individual-axis feedback control portion 107 calculates control gains of the actuator 109 of each joint axis in proportion to the weight calculated for that actuator 109 by the individual-actuator weight computation portion 105. Besides, assuming that the target motion is satisfied, the individual-axis feedback control portion 107 calculates an independent-axis torque reference input such that the measured independent-axis position (position of the independent axis) measured by the position sensor 111 converges to the independent-axis position reference input calculated by the minimum-of-cost-function computation portion 106. Furthermore, the individual-axis feedback control portion 107 calculates a dependent-axis torque reference input such that the target motion is satisfied, assuming that the change in the measured independent-axis position is sufficiently slower than the change in the measured dependent-axis position (the position of the dependent axis measured by the position sensor 111).

Hereinafter, the independent-axis torque reference input is a torque reference input for driving the actuator 109 of each independent axis, and the dependent-axis torque reference input is a torque reference input for driving the actuator 109 of each dependent axis. The individual-axis feedback control portion 107 outputs the calculated independent-axis torque reference inputs and the calculated dependent-axis torque reference inputs to the torque control portion 108.

The torque control portion 108, according to the independent-axis torque reference input calculated by the individual-axis feedback control portion 107, outputs a drive current for driving the actuator 109 of the corresponding independent axis to that actuator 109. Similarly, the torque control portion 108, according to the dependent-axis torque reference input calculated by the individual-axis feedback control portion 107, outputs a drive current for the actuator 109 of the corresponding dependent axis to that actuator 109.

Incidentally, the robot controller 102 has a hardware construction that, for example, includes as a central unit a microcomputer that has a CPU (Central Processing Unit) that executes control processes and computation processes, a ROM (Read-Only Memory) in which, for example, control programs and computation programs that are executed by the CPU, and a RAM (Random Access Memory) provided for temporarily storing processed data, and the like. Besides, the individual-actuator weight computation portion 105, the minimum-of-cost-function computation portion 106, the individual-axis feedback control portion 107, and the torque control portion 108 can be realized, for example, by programs that are stored in the ROM and that are executed by the CPU.

The actuators 109 are, for example, servomotors or the like that rotationally drive the joint axes of the robot mechanism 110. Each actuator 109 rotationally drives a corresponding one of the joint axes of the robot mechanism 110 according to the drive current from the torque control portion 108 so as to cause the robot apparatus 101 to perform a desired motion.

The plurality of position sensors 111 are, for example, potentiometers, encoders, and resolvers. Each position sensor 111 is provided at a corresponding one of the joint axes of the robot mechanism 110, and is able to measure the position of the corresponding joint axis. A position sensor 111 measures, for example, the position of an independent axis, and outputs the measured position thereof as the measured independent-axis position to the individual-axis feedback control portion 107. Likewise, a position sensor 111 measures, for example, the position of a dependent axis, and outputs the measured position thereof as a measured dependent-axis position to the individual-axis feedback control portion 107.

Figure 2:
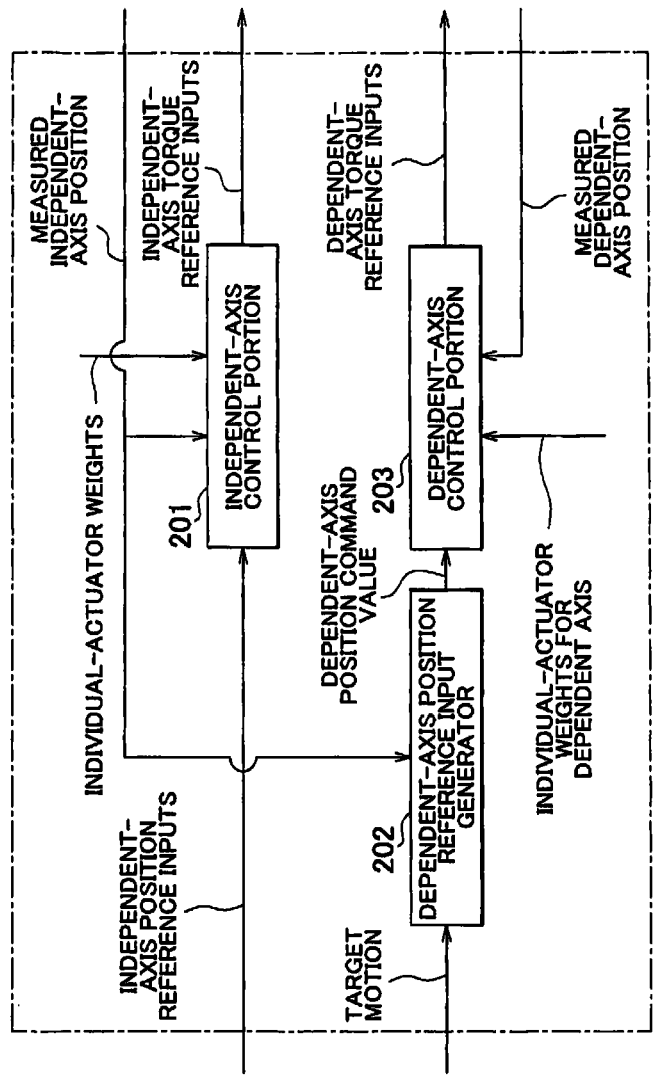
FIG. 2 is a block diagram showing a general system construction of an individual-axis feedback control portion of a robot controller in accordance with an embodiment of the invention.

FIG. 2, is a block diagram showing a general system construction of the individual-axis feedback control portion of a robot controller in accordance with an embodiment of the invention. The individual-axis feedback control portion 107 in accordance with this embodiment has an independent-axis control portion 201, a dependent-axis position reference input generator 202, and a dependent-axis control portion 203.

The independent-axis control portion 201 calculates control gains for an independent axis in proportion to the weight (control gain balance) calculated for the actuator of the independent axis by the individual-actuator weight computation portion 105 (e.g., by multiplying the weight for each actuator by a proportion coefficient). Then, using the calculated control gains of the independent axis, the independent-axis control portion 201 calculates an independent-axis torque reference input so that the measured independent-axis position from the position sensor 111 converges to the independent-axis position reference input calculated by the minimum-of-cost-function computation portion 106. The independent-axis control portion 201 outputs the calculated independent-axis torque reference input to the torque control portion 108.

Based on the measured dependent-axis position from the position sensor 111 and the target motion generated by the target motion generator 103, the dependent-axis position reference input generator 202 calculates a dependent-axis position reference input that is a position of the dependent axis that satisfies the target motion. The dependent-axis position reference input generator 202 outputs the calculated dependent-axis position reference input to the dependent-axis control portion 203.

The dependent-axis control portion 203 calculates control gains for a dependent axis in proportion to the weight (control gain balance) calculated for the actuator of the dependent axis by the individual-actuator weight computation portion 105. Then, using the calculated control gains of the dependent axis, the dependent-axis control portion 203 calculates a dependent-axis torque reference input so that the measured dependent-axis position from the position sensor 111 converges to the dependent-axis position reference input calculated by the dependent-axis position reference input generator 202. The dependent-axis control portion 203 outputs the calculated dependent-axis torque reference input to the torque control portion 108.

Incidentally, the independent-axis control portion 201 and the dependent-axis control portion 203 are able to perform the foregoing controls by using an arbitrary control law, for example, feedback linearization, sliding mode control, adaptive control, neuro-control, fuzzy control, disturbance observer, linear control, or an arbitrary combination of these control laws and the like.

Figure 3:
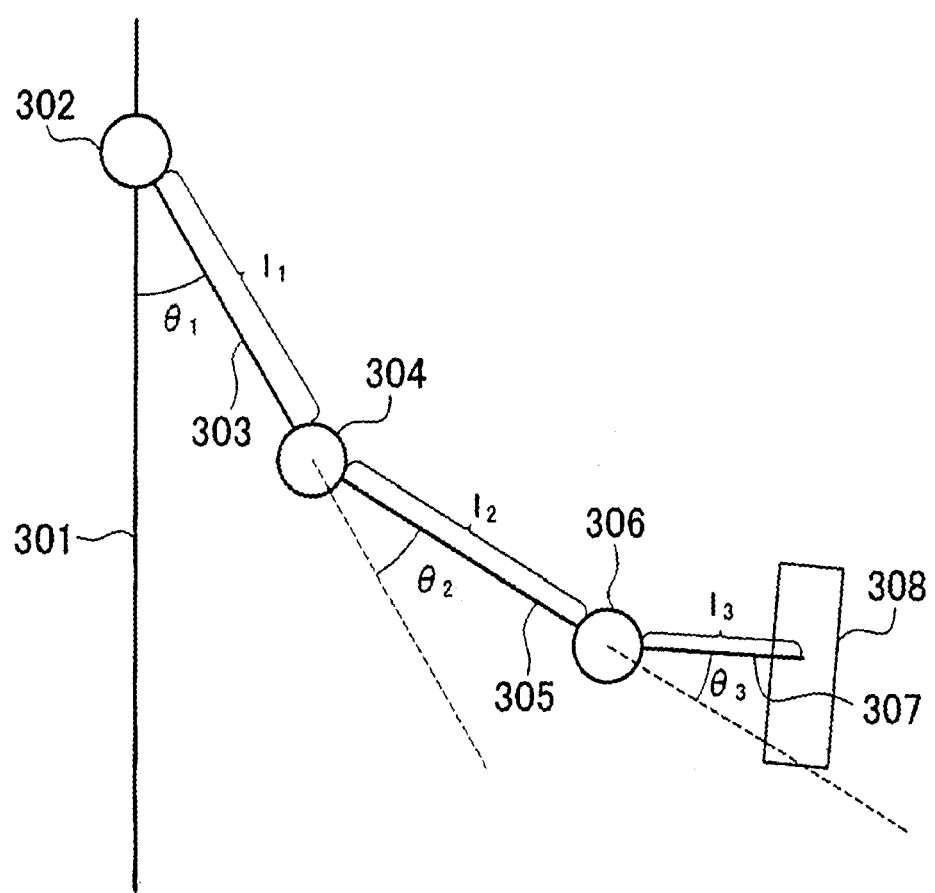
FIG. 3 is a diagram schematically showing a mechanism model of a robot apparatus in accordance with an embodiment of the invention.

Next, a concrete example of the control process of a robot apparatus in accordance with an embodiment of the invention will be described. FIG. 3 is a diagram schematically showing a robot mechanism model of a robot apparatus in accordance with an embodiment of the invention. A robot mechanism 110 in accordance with this embodiment has a trunk portion 301, an upper arm portion 303 that is pivotably linked to the trunk portion 301 via a shoulder joint axis 302, a forearm portion 305 that is pivotably linked to the upper arm portion 303 via an elbow joint axis 304, and a hand portion 307 that is pivotably linked to the forearm portion 305 via a wrist joint axis 306. Besides, a holding object 308 is held by the hand portion 307.

For mathematical expressions, for example, the position of the shoulder joint axis 302 is represented by $\theta_1$, and the position of the elbow joint axis 304 is represented by $\theta_2$, and the position of the wrist joint axis 306 is represented by $\theta_3$, and the length of the upper arm portion 303 is represented by $l_1$, and the length of the forearm portion 305 is represented by $l_2$, and the length of the hand portion 307 is represented by $l_3$, and the mass of the upper arm portion 303 is represented by $m_1$, and the mass of the forearm portion 305 is represented by $m_2$, and the mass of the hand portion 307 is represented by $m_3$, and the mass of the holding object 308 is represented by $m_0$. Furthermore, the distance from the center of gravity of the upper arm portion 303 to the shoulder joint axis 302 is represented by $l_{1c}$, and the distance from the center of gravity of the forearm portion 305 to the elbow joint axis 304 is represented by $l_{2c}$, and the distance from the center of gravity of the hand portion 307 to the wrist joint axis 306 is represented by $l_{3c}$.

For example, a case is assumed where the holding object 308 is a glass that contains a beverage or the like, and where the robot mechanism 110 of the robot apparatus 101 holds the holding object 308, and moves the holding object 308 to a destination. In this case, the shoulder joint torque $T_1$, the elbow joint torque $T_2$ and the wrist joint torque $T_3$ that are needed for the shoulder joint axis 302, the elbow joint axis 304 and the wrist joint axis 306 during a steady state can be expressed by (1), (2) and (3) below, respectively.

$$T_1 = m_1 g l_{1c} \sin\theta_1 + m_2 g[l_1 \sin\theta_1 + l_{2c}\sin(\theta_1 + \theta_2)] + \quad (1)$$
$$m_3 g[l_1\sin\theta_1 + l_2 \sin(\theta_1 + \theta_2) + l_{3c}\sin(\theta_1 + \theta_2 + \theta_3)] +$$
$$m_0 g[l_1\sin\theta_1 + l_2\sin(\theta_1 + \theta_2) + l_3\sin(\theta_1 + \theta_2 + \theta_3)]$$

$$T_2 = m_2 g l_{2c}\sin(\theta_1 + \theta_2) + m_3 g[l_1\sin(\theta_1 + \theta_2) + l_{3c}\sin(\theta_1 + \theta_2 + \theta_3)] + \quad (2)$$
$$m_0 g[l_2\sin(\theta_1 + \theta_2) + l_3\sin(\theta_1 + \theta_2 + \theta_3)]$$

$$T_3 = m_3 g l_{3c}\sin(\theta_1 + \theta_2 + \theta_3) + m_0 g l_3\sin(\theta_1 + \theta_2 + \theta_3) \quad (3)$$

In this embodiment, since the holding object 308 is a glass that contains a beverage or the like, the target motion is to horizontally maintain the holding object 308. In this case, the shoulder joint axis 302 (position $\theta_1$), and the elbow joint axis 304 (position $\theta_2$) are independent axes, and the wrist joint axis 306 (position $\theta_3$) is a dependent axis. Then, the target motion generator 103 geometrically generates a target motion expressed as (4) below, and outputs the generated target motion to the minimum-of-cost-function computation portion 106.

$$\theta_3 = \frac{\pi}{2} - \theta_1 - \theta_2 \quad (4)$$

Besides, for example, let us assume that the robot mechanism 110 moves the holding object 308 between a table and a wall (interval h). In this case, the motion environment detector 104 geometrically calculates the movable ranges $\Omega_e$ of the shoulder joint axis 308, the elbow joint axis 304 and the wrist joint axis 306 such that the robot mechanism 110 does not contact the table nor the wall, as in (5) below.

$$\Omega_e = \{\theta_1, \theta_2, \theta_3 : l_1 \sin\theta_1 + l_2 \sin(\theta_1 + \theta_2) + l_3 \sin(\theta_1 + \theta_2 + \theta_3) < h\} \quad (5)$$

The motion environment detector 104 calculates constraint condition $\Omega$ below using (6) which satisfies both the movable ranges $\Omega_e$ of the shoulder joint axis 302, the elbow joint axis 304 and the wrist joint axis 306 calculated using (5) and the limiting movable ranges $\Omega_m$ of the shoulder joint axis 302, the elbow joint axis 304 and the wrist joint axis 306. Then, the motion environment detector 104 outputs the constraint conditions $\Omega$ that is calculated using (6), to the minimum-of-cost-function computation portion 106.

$$\Omega = \Omega_m \cap \Omega_e \quad (6)$$

The minimum-of-cost-function computation portion 106, using the cost function in (7) below, calculates the position of each of the independent axes (independent-axis position reference input thereof) that minimizes the cost function and that minimizes the electric power consumption. Incidentally, as shown in (7), the cost function is expressed as a sum of the squares of the shoulder joint torque $T_1$, the elbow joint torque $T_2$ and the wrist joint torque $T_3$, and is a function of only the positions of the independent axes, that is, the position $\theta_1$ of the shoulder joint axis 302 (hereinafter, referred to as "the shoulder joint position $\theta_1$") and the position $\theta_2$ of the elbow joint axis 304 (hereinafter, referred to as "the elbow joint position $\theta_2$").

$$f_1(\theta_1, \theta_2) = T_1^2 + T_2^2 + T_3^3 \quad (7)$$

The minimum-of-cost-function computation portion 106 performs the following calculations substituting (1) through (4) in (7). Next, the minimum-of-cost-function computation portion 106 calculates extremum points of cost function ($\theta_1^*$, $\theta_2^*$), using (8) below.

$$(\theta_1^*, \theta_2^*) = \arg\{\theta_1, \theta_2 : \nabla f = O\}$$
$$\text{where } \nabla = (\partial/\partial\theta_1, \partial/\partial\theta_2), O = (0,0) \quad (8)$$

Furthermore, the minimum-of-cost-function computation portion 106 calculates the signs of the cost function's second-order derivatives in (9) and (10) shown below, at the extrum points of cost function ($\theta_1^*$, $\theta_2^*$). In (9), $\Delta$ is a Laplacian.

$$s_d = \text{sgn}(\Delta f \big|_{\theta_1 = \theta_1^*, \theta_2 = \theta_2^*}) \quad (9)$$

$$s_c = \text{sgn}\left(\frac{\partial^2 f}{\partial \theta_1^2}\frac{\partial^2 f}{\partial \theta_2^2} - \left(\frac{\partial f}{\partial \theta_1 \partial \theta_2}\right)^2 \bigg|_{\theta_1 = \theta_1^*, \theta_2 = \theta_2^*}\right) \quad (10)$$

The minimum-of-cost-function computation portion 106 calculates as the minimum of the cost function the smallest among the values of the cost function at the extremum points of the cost function ($\theta_1^*$, $\theta_2^*$) which satisfies $S_d > 0$ and $S_c > 0$ in (9) and (10), respectively, and the values of the cost function at the ends of the constraint condition $\Omega$ in (6). Then, the minimum-of-cost-function computation portion 106 outputs the shoulder joint position $\theta_1$ and the elbow joint position $\theta_2$ at the calculated minimum of the cost function to the individual-axis feedback control portion 107 as independent-axis position reference inputs $r_1$ and $r_2$.

Next, control processes performed in the individual-axis feedback control portion 107 will be described in detail. Herein, an upper arm horizontal position $x_1$ that is the position of the center of gravity of the upper arm portion 303 and is the horizontal position thereof relative to the trunk portion 301 is found using (11) below, and an upper arm vertical position $y_1$ that is the position of the center of gravity of the upper arm portion 303 and that is the vertical position thereof from the elbow joint axis 304 when the shoulder joint position $\theta_1$ is 0° is found using (12) below.

Besides, a forearm horizontal position $x_2$ that is the position of the center of gravity of the forearm portion 305 and that is the horizontal position thereof from the trunk portion 301 is found using (13), and a forearm vertical position $y_2$ that is the position of the center of gravity of the forearm portion 305 and that is the vertical position thereof from the wrist joint axis 306 when the shoulder joint position $\theta_1$ and the elbow joint position $\theta_2$ are 0° is found using (14).

Furthermore, a hand horizontal position $x_3$ that is the position of the center of gravity of the hand portion 307 and, that is the horizontal position thereof from the trunk portion 301 is found using (15), and a hand vertical position $y_3$ that is the position of the center of gravity of the hand portion 307 and that is the vertical position thereof from the position of the center of gravity of the holding object 308 when the shoulder joint position $\theta_1$, the elbow joint position $\theta_2$ and the wrist joint position $\theta_3$ are 0° is found using (16).

Furthermore, a holding object horizontal position $x_0$ that is the position of the center of gravity of the holding object 308 and that is the horizontal position thereof from the trunk portion 301 is found using (17), and a holding object vertical position that is the position of the center of gravity of the holding object 308 and that is the vertical position thereof from the position of the center of gravity of the holding object 308 when the shoulder joint position $\theta_1$, the elbow joint position $\theta_2$ and the wrist joint position $\theta_3$ are 0° is found using (18).

$$x_1 = l_{1c}\sin\theta_1 \tag{11}$$

$$y_1 = l_{1c}(1 - \cos\theta_1) \tag{12}$$

$$x_2 = l_1\sin\theta_1 + l_{2c}\sin(\theta_1 + \theta_2) \tag{13}$$

$$y_2 = l_1(1 - \cos\theta_1) + l_{2c}[1 - \cos(\theta_1 + \theta_2)] \tag{14}$$

$$x_3 = l_1\sin\theta_1 + l_2\sin(\theta_1 + \theta_2) + l_{3c}\sin(\theta_1 + \theta_2 + \theta_3) \tag{15}$$

$$y_3 = l_1(1 - \cos\theta_1) + l_2[1 - \cos(\theta_1 + \theta_2)] + l_{3c}[1 - \cos(\theta_1 + \theta_2 + \theta_3)] \tag{16}$$

$$x_0 = l_1\sin\theta_1 + l_2\sin(\theta_1 + \theta_2) + l_3\sin(\theta_1 + \theta_2 + \theta_3) \tag{17}$$

$$y_0 = l_1(1 - \cos\theta_1) + l_{2c}[1 - \cos(\theta_1 + \theta_2)] + l_3[1 - \cos(\theta_1 + \theta_2 + \theta_3)] \tag{18}$$

Herein, the individual-actuator weight computation portion 105, for example, sets relatively low the individual-actuator weight for each of the actuators 109 of the shoulder joint axis 302 (the shoulder joint position $\theta_1$), and the elbow joint axis 304 (the elbow joint position $\theta_2$), which are independent axes, and outputs the set individual-actuator weights to the individual-axis feedback control portion 107. The independent-axis control portion 201 of the individual-axis feedback control portion 107 calculates the control gains of the shoulder joint position $\theta_1$ and the elbow joint position $\theta_2$ so that the control gains are relatively low, in proportion to these individual-actuator weights set low.

On the other hand, the individual-actuator weight computation portion 105 sets relatively high the individual-actuator weight for the actuator 109 of the wrist joint axis 306 (wrist joint position $\theta_3$), which is a dependent axis, and outputs the set individual-actuator weight to the individual-axis feedback control portion 107. The dependent-axis control portion 203 of the individual-axis feedback control portion 107 calculates the control gain of the wrist joint position $\theta_3$ so as to be relatively high, in proportion to this individual-actuator weight.

Thus; in the case where the target motion is to horizontally maintain the holding object (a glass containing a beverage or the like) 308, for example, the motion of the wrist joint axis 306 becomes important, and it becomes necessary to apply relatively large force to the wrist joint axis 306. On the other hand, the motions of the shoulder joint axis 302 and the elbow joint axis 304 are not very important, and the force applied to the shoulder joint axis 302 and the elbow joint axis 304 can be made small. Therefore, as described above, the individual-actuator weight computation portion 105 sets relatively high the individual-actuator weight for the wrist joint axis 306, which is important, and the dependent-axis control portion 203 calculates the control gains of the wrist joint position $\theta_3$ so as to be relatively high, in proportion to the individual-actuator weight that is set high. On the other hand, the individual-actuator weight computation portion 105 sets relatively low the individual-actuator weights for the shoulder joint axis 302 and the elbow joint axis 304, which are not very important. Then, the independent-axis control portion 203 calculates the control gains of the shoulder joint position $\theta_1$ and the elbow joint position $\theta_3$ so as to be relatively low, in proportion to the individual-actuator weights that are set low.

Therefore, it becomes possible to apply to the joint axes 302, 304 and 306 optimum forces commensurate with the degrees of importance of the motions of the shoulder joint axis 302, the elbow joint axis 304 and the wrist joint axis 306. Therefore, it is possible to exclude useless forces and restrain the electric power consumption of the robot apparatus 101 while performing flexible and safe motions. That is, it becomes possible to perform a flexible motions in which large force is applied to the wrist joint axis 306, which performs important motions, so that the joint is strained, and in which small force is applied to the shoulder joint axis 302 and the elbow joint axis 304, which perform not very important motions, so that the joints are relatively relaxed. Therefore, the robot mechanism 110, even when contacting an obstacle, such as a person, a thing, or the like, around the mechanism 110, is able to contact the obstacle flexibly and safely, and is also able to minimize the electric power consumption of the robot apparatus 101.

Incidentally, it can be assumed that the response of the wrist joint position $\theta_3$ of the dependent axis is sufficiently faster than the responses of the shoulder joint position $\theta_1$ and the elbow joint position $\theta_2$ of the independent axes so that (4) is satisfied. With this assumption, the potential energy $V_s$ can be found using (19), and the kinetic energy $T_s$ can be found using (20).

$$\begin{aligned}V_s &= m_1 g y_1 + m_2 g y_2 + m_3 g y_3 + m_0 g y_0 \\ &= m_1 g y_{1c}(1 - \cos\theta_1) + m_2 g \\ &\quad \{l_1(1 - \cos\theta_1) + l_{2c}[1 - \cos(\theta_1 + \theta_2)]\} + \\ &\quad m_3 g\{l_1(1 - \cos\theta_1) + l_2[1 - \cos(\theta_1 + \theta_2)] + l_{3c}\} + \\ &\quad m_0 g\{l_1(1 - \cos\theta_1) + l_2[1 - \cos(\theta_1 + \theta_2)] + l_{3c}\}\end{aligned} \tag{19}$$

$$\begin{aligned}T_s &= \frac{1}{2}m_1(\dot{x}_1^2 + \dot{y}_1^2) + \frac{1}{2}m_2(\dot{x}_2^2 + \dot{y}_2^2) + \frac{1}{2}m_3(\dot{x}_3^2 + \dot{y}_3^2) + \\ &\quad \frac{1}{2}m_0(\dot{x}_0^2 + \dot{y}_0^2) \\ &= \frac{1}{2}m_1 l_{1c}^2 \dot{\theta}_1^2 + \\ &\quad \frac{1}{2}m_2\left[l_1^2\dot{\theta}_1^2 + l_{2c}^2(\dot{\theta}_1 + \dot{\theta}_2)^2 + 2l_1 l_{2c}\dot{\theta}_1(\dot{\theta}_1 + \dot{\theta}_2)\cos\theta_2\right] + \\ &\quad \frac{1}{2}m_3\left[l_1^2\dot{\theta}_1^2 + l_2^2(\dot{\theta}_1 + \dot{\theta}_2)^2 + 2l_1 l_2 \dot{\theta}_1(\dot{\theta}_1 + \dot{\theta}_2)\cos\theta_2\right] + \\ &\quad \frac{1}{2}m_0\left[l_1^2\dot{\theta}_1^2 + l_2^2(\dot{\theta}_1 + \dot{\theta}_2)^2 + 2l_1 l_2 \dot{\theta}_1(\dot{\theta}_1 + \dot{\theta}_2)\cos\theta_2\right]\end{aligned} \tag{20}$$

Besides, by substituting (19) and (20) in the Euler-Lagrange equation, independent-axis motion equations for the shoulder joint position $\theta_1$ and the elbow joint position $\theta_2$ of the independent axes can be written as in (21) and (22). Incidentally, in (21) and (22), $d_1$ and $d_2$ represent the torque disturbances to the actuators 109 that drive the shoulder joint axis 302 and the elbow joint axis 304.

$$(m_1 l_{1c}^2 + m_2 l_1^2 + m_3 l_1^2 + m_0 l_1^2)\ddot{\theta}_1 + (m_2 l_{2c}^2 + m_3 l_2^2 + m_0 l_2^2)(\ddot{\theta} + \ddot{\theta}_2) + \qquad (21)$$
$$(m_2 l_1 l_{2c} + m_3 l_1 l_2 + m_0 l_1 l_2)[(2\dot{\theta}_1 + \dot{\theta}_2)\cos\theta_2 - (2\dot{\theta}_1 + \dot{\theta}_2)\dot{\theta}_2\sin\theta_2] -$$
$$(m_1 l_{1c} + m_2 l_1 + m_3 l_1 + m_0 l_1) g\sin\theta_1 -$$
$$(m_2 l_{2c} + m_3 l_2 + m_0 l_2) g\sin(\theta_1 + \theta_2) = T_{ref1} + d_1$$

$$(m_2 l_{2c}^2 + m_3 l_2^2 + m_0 l_2^2)(\ddot{\theta} + \ddot{\theta}_2) + (m_2 l_1 l_{2c} + m_3 l_1 l_2 + m_0 l_1 l_2)\dot{\theta}_1\cos\theta_2 - \qquad (22)$$
$$(m_2 l_{2c} + m_3 l_2 + m_0 l_2) g\sin(\theta_1 + \theta_2) = T_{ref2} + d_2$$

The independent-axis control portion 201 of the individual-axis feedback control portion 107 calculates independent-axis torque reference inputs so that the measured independent-axis positions of the shoulder joint position $\theta_1$ and the elbow joint position $\theta_2$ from the position sensors 111 converge to the independent-axis position reference inputs calculated by the minimum-of-cost-function computation portion 106, using a control designed based on the independent-axis motion equations (21) and (22). Then, the independent-axis control portion 201 outputs the independent-axis torque reference inputs to the torque control portion 108.

Incidentally, the independent-axis control portion 201 is able to linearize the independent-axis motion equations (21) and (22) with respect to the shoulder joint position $\theta_1$ and the elbow joint position $\theta_2$ in the vicinity of the minimum of the cost function, and is able to apply an arbitrary linear control law, such as P control, PI control, I-P control, and PID control.

On the other hand, based on the foregoing assumption in conjunction with (21) and (22), the shoulder joint position $\theta_1$ and the elbow joint position $\theta_2$ change sufficiently more slowly than the wrist joint position $\theta_3$, so that the shoulder joint position $\theta_1$ and the elbow joint position $\theta_2$ are assumed to be approximately constant. With this assumption, the potential energy $V_f$ can be found using (23), and the kinetic energy. $T_f$ can be found using (24).

$$V_f = m_1 g y_1 + m_2 g y_2 + m_3 g y_3 + m_0 g y_0 \qquad (23)$$
$$= m_1 g y_{1c}(1 - \cos\theta_1) +$$
$$m_2 g \{l_1(1 - \cos\theta_1) + l_{2c}[1 - \cos(\theta_1 + \theta_2)]\} +$$
$$m_3 g \left\{ \begin{array}{l} l_1(1 - \cos\theta_1) + l_2[1 - \cos(\theta_1 + \theta_2)] + \\ l_{3c}[1 - \cos(\theta_1 + \theta_2 + \theta_3)] \end{array} \right\} +$$
$$m_0 g \left\{ \begin{array}{l} l_1(1 - \cos\theta_1) + l_2[1 - \cos(\theta_1 + \theta_2)] + \\ l_{3c}[1 - \cos(\theta_1 + \theta_2 + \theta_3)] \end{array} \right\}$$

$$T_f = \frac{1}{2} m_1(\dot{x}_1^2 + \dot{y}_1^2) + \frac{1}{2} m_2(\dot{x}_2^2 + \dot{y}_2^2) + \frac{1}{2} m_3(\dot{x}_3^2 + \dot{y}_3^2) + \qquad (24)$$
$$\frac{1}{2} m_0(\dot{x}_0^2 + \dot{y}_0^2)$$
$$= \frac{1}{2}(m_3 l_{3c}^2 + m_0 l_3^2)\dot{\theta}_3^2$$

Besides, substituting (23) and (24) in the Euler-Lagrange equation, a dependent-axis motion equation for the wrist joint position $\theta_3$ of the dependent axis can be written as in (25). Incidentally, in (25), $d_3$ represents the torque disturbance to the actuator 109 that drives wrist joint axis 306.

$$(m_3 l_{3c}^2 + m_0 l_3^2)\ddot{\theta}_3 - (m_3 l_{3c} + m_0 l_3) g\sin(\theta_1 + \theta_2 + \theta_3) = T_{ref3} + d_3 \qquad (25)$$

The dependent-axis control portion 203 of the individual-axis feedback control portion 107 calculates a dependent-axis torque reference input so that the measured dependent-axis position of the wrist joint position $\theta_3$ measured by the position sensor 111 converges to the dependent-axis position reference input calculated by the dependent-axis position reference input generator 202, using a control designed based on the dependent-axis motion equation (25). Then, the dependent-axis control portion 203 outputs the calculated dependent-axis torque reference input to the torque control portion 108.

Thus, the robot apparatus 101 in accordance with this embodiment is able to flexibly perform desired motions while avoiding the contact of the robot mechanism 110 with the table or the wall around the robot mechanism 110, controlling the robot mechanism 110 so as to satisfy the target generated by the target motion generator 103 as shown in (4) and the constraint condition Ω that is calculated by the motion environment detector 104 as shown in (6). Furthermore, calculating the independent-axis position reference inputs so that the cost function in (7) becomes minimum, the electric power consumption of the robot apparatus 101 can be minimized.

Incidentally, the dependent-axis control portion 203 is able to linearize the dependent-axis motion equation (25) with respect to the wrist joint position $\theta_3$ in the vicinity of the minimum of the cost function, and is able to apply an arbitrary linear control law, such as P control, PI control, I-P control, and PID control.

Next, simulation results of simulations of control processes of the robot apparatus 101 in accordance with this embodiment will be described in detail. Herein, the parameters used are as follows: $l_1=250\times10^{-3}$ [m], $l_2=215\times10^{-3}$ [m], $l_3=40\times10^{-3}$ [m], $l_{1c}=125\times10^{-3}$ [m], $l_{2c}=108\times10^{-3}$ [m], $l_{3c}=200\times10^{-3}$ [m], $m_1=1.43$ [kg], $m_2=0.84$ [kg], $m_3=0.30$ [kg], $\theta_{1min}=0$ [rad], $\theta_{1max}=\pi$ [rad], $\theta_{2min}=0$ [rad], $\theta_{2max}=\pi/2$ [rad], $\theta_{3min}=-2\pi/3$ [rad], $\theta_{3max}=\pi/2$ [rad], $m_0=0.5$ [kg], $T=125\times10^{-6}$ [s], $p=(-1\times2\pi, -1\times2\pi, -2\times2\pi, -2\times2\pi)$ [rad/s], $K_{p3}=10$ [s$^{-1}$], $K_{v3}=K_{p3}\times2\times pi$, $K_{vj3}=K_{v3}\times J_3$ [s$^{-1}$], $T_{i3}=4/K_{v3}$ [s], $r_{1conv}=\pi/6$ [rad], $r_{2conv}=\pi/6$ [rad], and $r_{3conv}=\pi/6$ [rad].

Besides, $\theta_{1min}$ is the lower bound of the movable range of the shoulder joint, and $\theta_{1max}$ is the upper bound of the movable range of the shoulder joint, and $\theta_{2min}$ is the lower bound of the movable range of the elbow joint, and $\theta_{2max}$ is the upper bound of the movable range of the elbow joint, and $\theta_{3min}$ is the lower bound of the movable range of the wrist joint, and $\theta_{3max}$ is the upper bound of the movable range of the wrist joint. Furthermore, T is the sampling period, and p is the closed-loop pole of each independent axis, and $K_{p3}$ is the position proportional control gain, and $K_{v3}$ is the normalized speed proportional control gain, and $K_{vj3}$ is the speed proportional control gain, and $T_{i3}$ is the speed control integration time constant, and $r_{1conv}$ is the shoulder joint position reference input in comparative examples, and $r_{2conv}$ is the elbow joint position reference input in comparative examples, and $r_{3conv}$ is the wrist joint position reference input in comparative examples.

Figure 4:
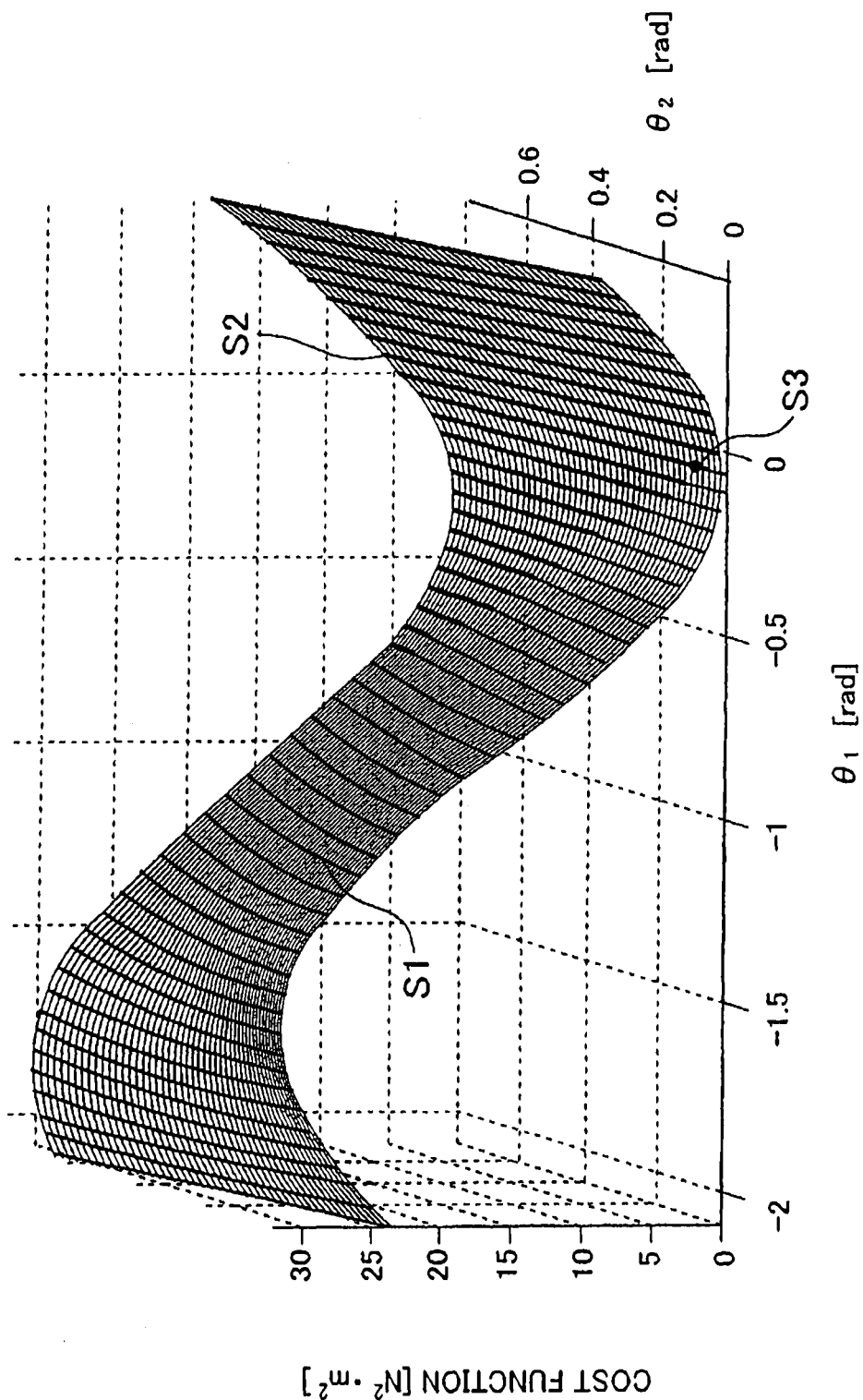
FIG. 4 is a diagram showing simulation results based on predetermined parameter values, and showing an example of a relation among a shoulder joint position θ1, an elbow joint position θ2, and the value of a cost function.

FIG. 4 is a diagram showing simulation results using the foregoing predetermined parameter values, and showing an example of a relation among the shoulder joint position $\theta_1$, the elbow joint position $\theta_2$ and the value of the cost function. In addition, in FIG. 4, the x-axis shows the shoulder joint position $\theta_1$, the y-axis shows the elbow joint position $\theta_2$, and the z-axis shows the value of the cost function. Besides, a fine-line-meshed portion S1 shows the values of the cost function that the minimum-of-cost-function computation portion 106 calculates using (7). A thick-line-meshed portion S2 shows the values of the cost function calculated by the minimum-of-cost-function computation portion 106 which satisfy the target motions generated by the target motion generator 103 as shown in (4), and the constraint condition Ω calculated by the motion environment detector 104 as shown in (6).

The minimum-of-cost-function computation portion 106 calculates, for example, the minimum S3 of the cost function shown by a large dot in FIG. 4. The minimum S3 of the cost function is $I_{cmin}$=0.142 [$N^{22}·m^2$], where the independent-axis position reference inputs corresponding to the shoulder joint position $θ_1$ and the elbow joint position $θ_2$ are $r_{1opt}$=–0.05 [rad] and $r_{2opt}$=0.06 [rad], respectively.

Figure 5A:
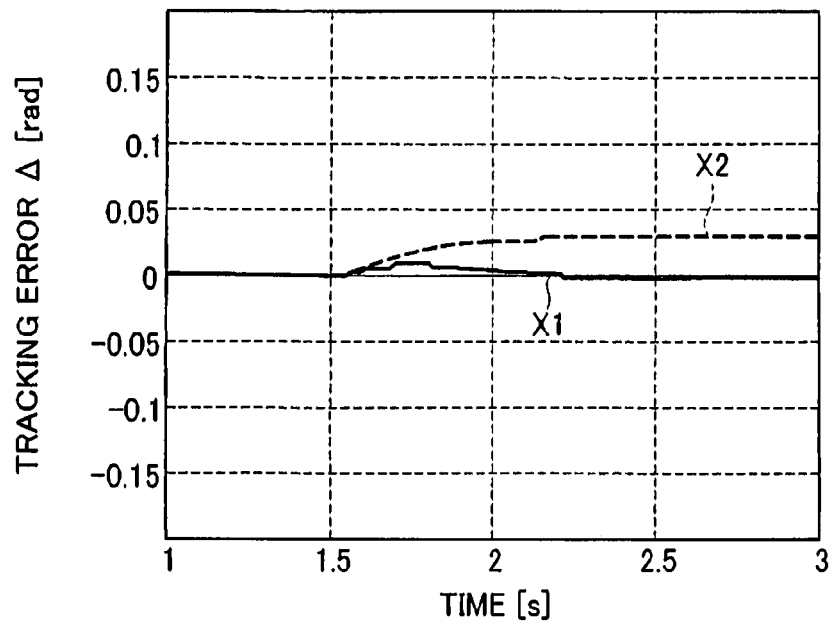
FIG. 5A is a diagram showing simulation results of the robot apparatus in the embodiment in a situation where step external force is applied in a horizontal direction at the center of a forearm portion.
Figure 5B:
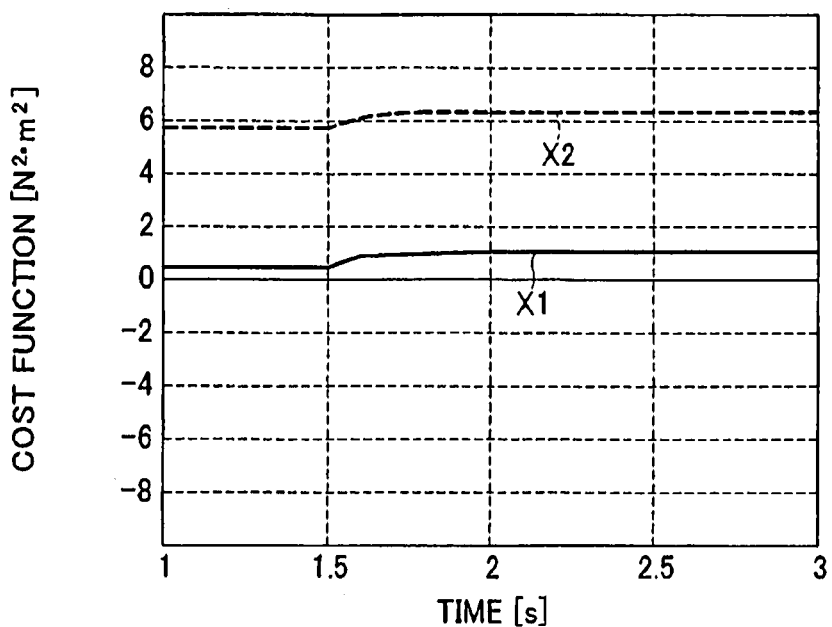
FIG. 5B is a diagram showing simulation results of a total torque reference inputs in the robot apparatus in accordance with the embodiment in a situation where step external force is applied in a horizontal direction at the center of the forearm portion.

FIG. 5A and FIG. 5B are diagrams showing simulation results of control processes performed by the robot apparatus 101 in accordance with the embodiment when step external force is applied to the center of the forearm portion 305 in a horizontal direction. In FIGS. 5A and 5B, a step external force of 0.98 [N] is applied to the center of the forearm portion 305 at 1.5 [s].

In FIG. 5A, the horizontal axis shows the elapsed time, and the vertical axis shows the position tracking error Δ of the position of the hand portion 307. Besides, the solid line X1 shows the position tracking error A of the position of the hand portion 307 by the robot apparatus 101 in accordance with the embodiment, and the dotted line X2 shows the tracking error of the hand portion in a comparative example. In addition, in the comparative example for use for comparison with the embodiment, the robot apparatus is designed so that the shoulder joint position $θ_1$, the elbow joint position $θ_2$ and the wrist joint position $θ_3$ follow the shoulder joint position reference input $r_{1conv}$, the elbow joint position reference input $r_{2conv}$, and the wrist joint position reference input $r_{3conv}$, and performs a position. P-control speed PI control using the position proportional control gain $K_{p3}$, the speed proportional control gain $K_{v3}$ and the speed control integration time constant $T_{i3}$.

As shown in FIG. 5A, the tracking error (dotted line) X2 in the comparative example converges to about 0.0286 [rad] after the application of the step external force, whereas the tracking error (solid line) X1 by the robot apparatus 101 in the embodiment converges to 5.5×10⁵ [rad]. That is, the robot apparatus 101 in accordance with the embodiment is able to reduce the tracking error Δ to 1/520 of that of the comparative example, and thus is able to improve the control performance.

In FIG. 5B, the horizontal axis shows the elapsed time, and the vertical axis shows the cost function that is the sum of the square of the shoulder joint torque reference input, the square of the elbow joint torque reference inputs, and the square of the wrist joint torque reference input. In addition, in FIG. 5B, the solid line X1 shows the cost function of the robot apparatus 101 in accordance with the embodiment, and the dotted line X2 shows the cost function in the comparative example.

As shown in FIG. 5B, before step external force is applied, the cost function (solid line) X1 in accordance with the embodiment is 0.337 [$N^2·m^2$], and the cost function (dotted line) X2 in accordance with the comparative example is 5.70 [$N^2·m^2$]. Besides, after the step external force is applied, the cost function X1 in accordance with the embodiment becomes 0.977 [$N^2·m^2$], and the cost function X2 in accordance with the comparative example becomes 6.34 [$N^2·m^2$]. Thus, before and after the step external force is applied, the cost function X1 in accordance with the embodiment can be reduced to about 1/16.9 and about 1/6.49, respectively, of the cost function X2 in accordance with the comparative example. For example, in the case where the torque constant is fixed and the voltage is fixed, the amount of electric power consumed by the robot apparatus 101 in accordance with the embodiment can be reduced to 1/6 or less of the amount of electric power consumed in accordance with the comparative example.

Furthermore, in the robot apparatus 101 in accordance with the embodiment, the closed loop poles of the shoulder joint axis and the elbow joint axis that are independent axes are set at –1×π [rad/s] and –2×2×π [rad/s], and the control gains calculated so as to be relatively low. Therefore, even when the robot mechanism 110 contacts an obstacle, the robot mechanism 110 is able to contact the obstacle flexibly and safely, and is able to maintain horizontally the holding object 308 that contains a beverage or the like, as required by the target motion.

Figure 6:
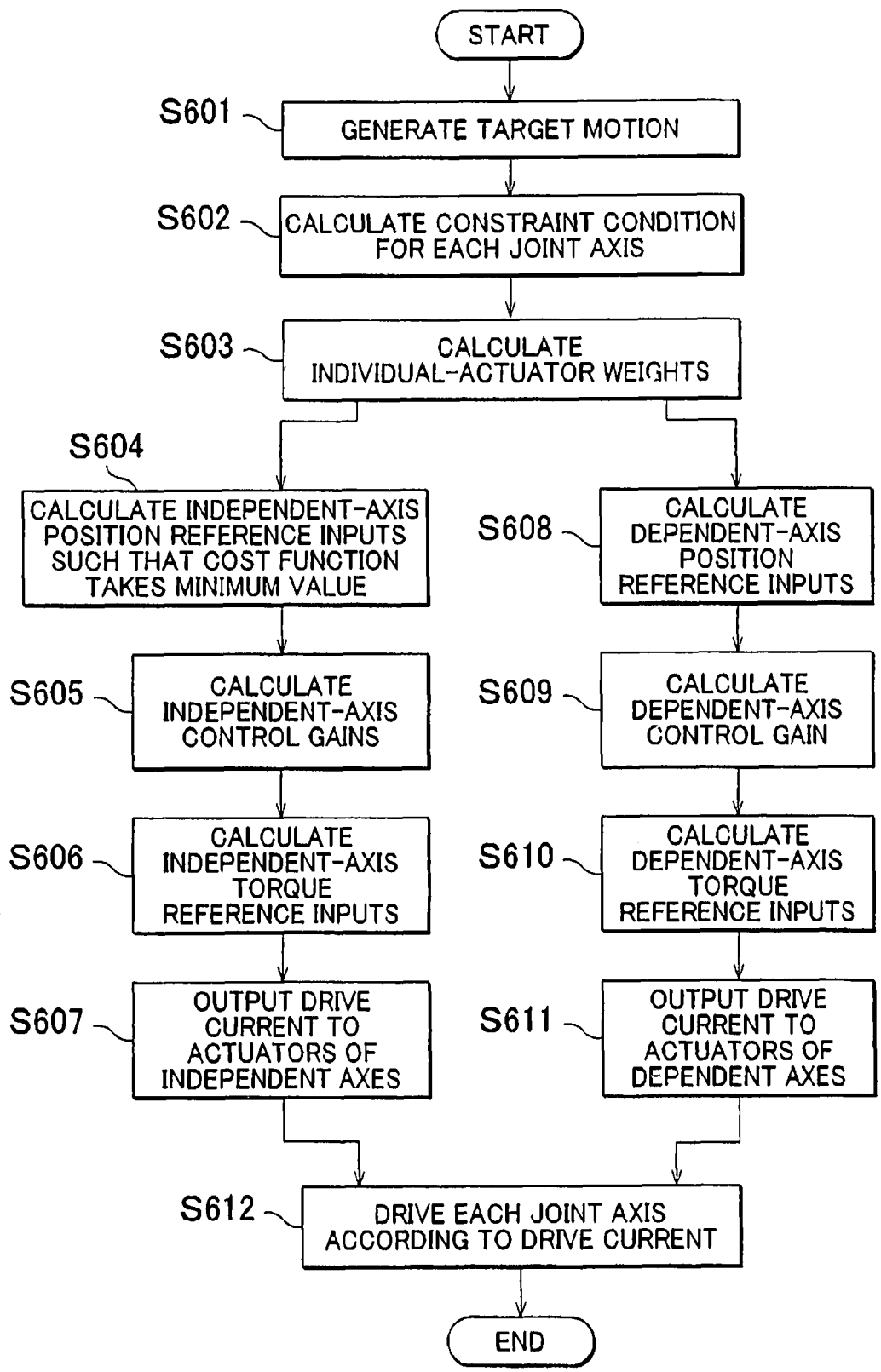
FIG. 6 is a flowchart showing an example of a control process flow performed by a robot apparatus in accordance with an embodiment of the invention.

Next, a sequence of control process performed by the robot apparatus in accordance with the embodiment will be described in detail. FIG. 6 is a flowchart showing a sequence of control process performed by the robot apparatus in accordance with the embodiment.

The target motion generator 103 generates a target motion (e.g., (4) shown above) of each joint axis of the robot mechanism 110 when the robot apparatus 101 is caused to perform a desired motion (step S601), and outputs the target motions to the minimum-of-cost-function computation portion 106 of the robot controller 102.

Besides, the motion environment detector 104, using various sensors of the robot apparatus 101, calculates movable ranges $Ω_e$ of the joint axes (the shoulder joint position $θ_1$, the elbow joint position $θ_2$ and the wrist joint position $θ_3$) such that the robot mechanism 110 does not contact the obstacle. Then, the motion environment detector 104 calculates constraint condition Ω of each joint axis of the robot mechanism 110 based on the calculated movable range $Ω_e$ of each joint axis, and the predetermined mechanically limited movable range $Ω_m$ of each joint axis of the robot mechanism 110 based (step S602), and outputs the calculated constraint condition Ω of each joint axis to the minimum-of-cost-function computation portion 106 of the robot controller 102.

Furthermore, the individual-actuator weight computation portion 105 calculates the individual-actuator weights for the actuators 109 (step S603) by comparing the target motion from the target motion generator 103 and the predetermined motion pattern, and outputs the calculated individual-actuator weights to the individual-axis feedback control portion 107.

Besides, the minimum-of-cost-function computation portion 106 calculates the independent-axis position reference inputs such that the cost function has the minimum, based on the target motion generated by the target motion generator 103 and the constraint conditions Ω for the individual joint axes calculated by, the motion environment detector 104 (step S604), and then outputs the calculated independent-axis position reference inputs to the individual-axis feedback control portion 107.

Next, the independent-axis control portion 201 of the individual-axis feedback control portion 107 calculates the control gains for the shoulder joint axis 302 and the elbow joint axis 304, which are independent axes, in proportion to the individual-actuator weights of the independent axes calculated by the individual-actuator weight computation portion 105, so that the control gains are relatively small (step S605). Then, the independent-axis control portion 201, using the calculated control gains of the independent axes, calculates independent-axis torque reference inputs so that the measured independent-axis positions from the position sensor 111 converge to the independent-axis position reference inputs that are calculated by the minimum-of-cost-function computation portion 106 (step S606), and outputs the calculated independent-axis torque reference inputs to the torque control portion 108.

The torque control portion 108, according to the independent-axis torque reference inputs calculated by the independent-axis control portion 201 of the individual-axis feedback control portion 107, outputs drive current to the actuators 109 of the corresponding independent axes (the shoulder joint axis 302, and the elbow joint axis 304) (step S607).

On the other hand, the dependent-axis position reference input generation portion 202 of the individual-axis feedback control portion 107 calculates a dependent-axis position reference input that is the position of a dependent axis (the wrist joint position $\theta_3$) that satisfies the target motion generated by the target motion generator 103, based on the target motion, and the measured dependent-axis position from the position sensor 111 (step S608), and then outputs the dependent-axis position reference input to the dependent-axis control portion 203. Next, the dependent-axis control portion 203 calculates the control gains for the wrist joint axis 306, which is a dependent axis so that the control gains are relatively high, in proportion to the individual-actuator weight of the dependent axis calculated by the individual-actuator weight computation portion 105 (step S609).

Then, using the calculated control gains of the dependent axis, the dependent-axis control portion 203 calculates a dependent-axis torque reference input so that the measured dependent-axis position from the position sensor 111 converges to the dependent-axis position reference input calculated by the dependent-axis position reference input generator 202 (step S610), and then outputs the calculated dependent-axis torque reference input to the torque control portion 108.

The torque control portion 108, according to the dependent-axis torque reference input calculated by the dependent-axis control portion 203 of the individual-axis feedback control portion 107, outputs drive current to the actuator 109 of the corresponding dependent axis (the wrist joint axis 306) (step S611).

Each actuator 109 drives a corresponding one of the joint axes (the shoulder joint axis 302, the elbow joint axis 304 and the wrist joint axis 306) of the robot mechanism 110 according to the drive current from the torque control portion 108 (step S612) so that the robot apparatus 101 is caused to perform a desired motion.

Thus, in the robot apparatus 101 in accordance with the embodiment, the minimum-of-cost-function computation portion 106 of the robot controller 102 calculates a minimum of the cost function that satisfies the target motion generated by the target motion generator 103 and the constraint condition $\Omega$ of each joint axis calculated by the motion environment detector 104, and calculates an independent-axis position reference input that is provided at that time. Therefore, the robot apparatus 101 is able to flexibly execute desired motions while restraining the electric power consumption of the robot apparatus 101.

Besides, the individual-actuator weight computation portion 105 calculates the individual-actuator weights for the individual actuators 109 according to the degree of importance of the motion of the actuator 109 of each joint axis. Then, the individual-axis feedback control portion 107 calculates control gains for the actuator 109 of each joint axis in proportion to a corresponding one of the calculated individual-actuator weights. Therefore, it becomes possible to apply to each joint axis an optimum force that is commensurate with the degree of importance of the motion of that joint axis. Hence, the robot apparatus of the embodiment is able to exclude useless forces and therefore restrain the electric power consumption of the robot apparatus 101 while performing flexible and safe motions. That is, it becomes possible to perform a flexible manner of motions in which large forces are applied to the joint axes that perform important motions, so that the joints are strained, and in which small forces are applied to the joint axes that performs not very important motions, so that the joints are relatively relaxed. Therefore, the robot mechanism 110, even when contacting an obstacle, such as a person, a thing, or the like, around the mechanism 110, is able to contact the obstacle flexibly and safely, and is also able to minimize the electric power consumption of the robot apparatus 101. That is, the robot apparatus 101 is able to flexibly execute desired motions while restraining the electric power consumption of the robot apparatus 101. In addition, by restraining the electric power consumption, the capacity of the battery can be restrained to a small capacity, so that the robot apparatus 101 can be reduced in size and weight.

Although in the foregoing embodiment, the minimum-of-cost-function computation portion 106 may compute as the minimum of the cost function the smallest among the values of the cost function at its extremum points ($\theta1^*$, $\theta2^*$), and at the ends of the constraint condition $\Omega$. The minimum-of-cost-function computation portion 106 may also calculate the minimum of the cost function by, for example, a numerical search method. Therefore, the minimum of the cost function can be more appropriately calculated with respect to the complicated robot mechanism 110. Furthermore, the minimum-of-cost-function computation portion 106 may also choose as a candidate for the minimum of the cost function a point that provides the smallest value around initial parameters selected using random numbers, and may determine the candidate as the minimum of the cost function. Besides, the foregoing calculation methods may be arbitrarily combined for use. Thus, an arbitrary method of calculation can be applied.

Besides, although in the foregoing embodiment, the cost function is expressed as the sum of the squares of the shoulder joint torque $T_1$, the elbow joint torque $T_2$ and the wrist joint torque $T_3$, the cost function is not limited so. For example, the cost function may also be expressed as the sum of the squares of the drive currents of the actuators 109 for the joints. That is, if the electric power consumption of the robot apparatus 101 can be appropriately evaluated, an arbitrary cost function can be employed.

Furthermore, although in the foregoing embodiment, the robot mechanism 110 is constructed so as to have the trunk portion 301, the shoulder joint axis 302, the upper arm portion 303, the elbow joint axis 304, the forearm portion 305, the wrist joint axis 306 and the hand portion 307, the construction of the robot mechanism 110 is not limited so. On the contrary, an arbitrary construction can be applied.

Although in the foregoing embodiment, the holding object 308 is a glass that contains a beverage or the like, the holding object 308 is not limited so, but may also be a tray or the like that carries thereon something to eat, and the robot mechanism 110 is applicable to an arbitrary holding object 308. For example, in the case where the holding object 308 is a cutting tool, a constraint condition $\Omega$ may be selected such that the cutting tool does not contact a person or a thing around the robot mechanism 110. In the case where the holding object 308 is a bag, a constraint condition $\Omega$ may be selected such that the bag does not contact the ground. Besides, although the target motion is to horizontally maintain the holding object 308, arbitrary target motion can be selected.

Although in the foregoing embodiment, the target motion generator 103 generates the target motion, this construction is not restrictive. For example, it is also permissible to adopt a construction in which the target motion is set in the robot apparatus 101 beforehand. Besides, although in the foregoing embodiment, the motion environment detector 104 calculates a constraint condition Ω for each of the joint axes of the robot mechanism 110, this construction is note restrictive. For example, it is also permissible to adopt a construction in which the constraint condition Ω is set beforehand in the robot apparatus 101.

The robot apparatus 101 in accordance with the invention is applicable to a wide variety of robot apparatuses of which flexibility, long charging interval, robustness, dexterity, are required, for example, domestic helper robots, care taker robots, and robots working in extreme environments.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

The invention claimed is:

1. A robot apparatus comprising:
a robot mechanism having a plurality of joints;
a plurality of actuators operable to drive joint axes of the robot mechanism; and
a robot controller operable to drive the actuators based on a cost function that is a function of torque reference inputs for the actuators,
wherein:
the robot controller has a minimum-of-cost-function computation portion for calculating the minimum of the cost function, and the robot controller is operable to drive the actuators so that the value of the cost function calculated by the minimum-of-cost-function computation portion becomes minimum; and
the robot apparatus further comprises position sensors operable to measure positions of the joint axes,
wherein:
the minimum-of-cost-function computation portion is operable to calculate as independent-axis position reference inputs the positions of the independent axes when the cost function becomes minimum;
the robot controller further has an individual-axis feedback control portion operable to calculate independent-axis torque reference inputs such that the positions of the independent axes from the position sensors converge to the independent-axis position reference inputs calculated by the minimum-of-cost-function computation portion;
the robot controller further has an individual-actuator weight computation portion operable to calculate individual-actuator weights that show a relative degree of importance of the plurality of actuators;
the individual-axis feedback control portion has an independent-axis control portion operable to calculate control gains for the independent axes in proportion to the individual-actuator weights calculated by the individual-actuator weight computation portion, and, using the calculated control gains, is operable to calculate the independent-axis torque reference inputs; and
the individual-actuator weight computation portion is operable to calculate an individual-actuator weight for each actuator according to a level of importance of motion of a corresponding joint axis caused by the actuator.

2. The robot apparatus according to claim 1, further comprising a target motion generator operable to generate a target motion that represents a desired motion of the robot mechanism,
wherein the minimum-of-cost-function computation portion classifies the plurality of joint axes of the robot mechanism into independent axes and dependent axes that depend on the independent axes based on the target motion generated by the target motion generator, and calculates the minimum of the cost function that employs only the positions of the independent axes as variables.

3. The robot apparatus according to claim 2, further comprising a motion environment detector operable to detect a motion environment of the robot mechanism,
wherein the minimum-of-cost-function computation portion is operable to calculate the minimum of the cost function based on the motion environment detected by the motion environment detector and the target motion generated by the target motion generator.

4. The robot apparatus according to claim 3, wherein the motion environment detector is operable to detect as the motion environment a constraint condition that satisfies movable ranges of the joint axes that is determined by an ambient environment of the robot mechanism, and also satisfies mechanically limited movable ranges of the joint axes.

5. The robot apparatus according to claim 2, wherein the individual-axis feedback control portion further has a dependent-axis position reference input generator operable to calculate dependent-axis position reference inputs based on the positions of the dependent axes from the position sensors and on the target motion generated by the target motion generator, and also has a dependent-axis control portion operable to calculate control gains for the dependent axes in proportion to the individual-actuator weights calculated by the individual-actuator weight computation portion, and that, using the calculated control gains, is operable to calculate dependent-axis torque reference inputs.

6. The robot apparatus according to claim 5, wherein the robot controller further has a torque control portion operable to drive the actuators based on the independent-axis torque reference inputs calculated by the independent-axis control portion or the dependent-axis torque reference inputs calculated by the dependent-axis control portion.

7. The robot apparatus according to claim 1, wherein the cost function is a sum of squares of torque reference inputs for the actuators.

8. The robot apparatus according to claim 1, wherein the minimum-of-cost-function computation portion is operable to calculate the minimum of the cost function by a numerical search method.

9. The robot apparatus according to claim 1, wherein the minimum-of-cost-function computation portion is operable to determine as the minimum of the cost function the smallest value among extrema of the cost function and values at the ends of a predetermined interval of the cost function.

10. The robot apparatus according to claim 1, wherein the minimum-of-cost-function computation portion is operable to choose as a candidate for the minimum of the cost function a point that provides the smallest value around an initial parameter that is selected using random numbers, and determine the candidate as the minimum of the cost function.

11. The robot apparatus according to claim 1, wherein the robot controller is operable to drive the actuators so that the actuators move flexibly.

12. A control method for a robot apparatus that includes a robot mechanism having a plurality of joints, and a plurality of actuators that drive joint axes of the robot mechanism, the control method comprisinG controlling the actuators based on a cost function that is a function of torque reference inputs for the actuators, wherein:

the controlling of the actuators includes calculating the minimum of the cost function, and driving the actuators so that the value of the cost function calculated becomes minimum;

the method comprises detecting positions of the joint axes;

the calculation of the minimum of the cost function includes calculating as independent-axis position reference inputs the positions of the independent axes when the cost function takes the minimum;

the controlling of the actuators further includes calculating independent-axis torque reference inputs such that the positions of the independent axes measured converge to the independent-axis position reference inputs calculated;

the controlling of the actuators includes calculating individual-actuator weights that show relative degrees of importance of the plurality of actuators;

the calculation of the independent axis torque reference inputs includes calculating control gains for the independent axes in proportion to the individual-actuator weights calculated, and also includes calculating the independent-axis torque reference inputs using the control gains calculated; and the method comprises calculating an individual-actuator weight for each actuator according to a level of importance of motion of a corresponding joint axis caused by the actuator.

13. The control method according to claim 12, further comprising generating a target motion that represents a desired motion of the robot mechanism, wherein the calculation of the minimum of the cost function includes classifying the plurality of joint axes of the robot mechanism into independent axes and dependent axes that depend on the independent axes based on the target motion, and calculating the minimum of the cost function that employs only the positions of the independent axes as variables.

14. The control method according to claim 13, further comprising detecting a motion environment of the robot mechanism, wherein the calculation of the minimum of the cost function includes calculating the minimum of the cost function based on the motion environment detected and the target motion generated.

15. The control method according to claim 13, wherein the calculation of the independent-axis torque reference inputs includes calculating dependent-axis position reference inputs based on the positions of the dependent axes measured and the target motion generated, and also includes calculating control gains for the dependent axes in proportion to the individual-actuator weights calculated, and calculating dependent-axis torque reference inputs by using the control gains calculated.

16. The control method according to claim 12, wherein the actuators are driven based on the cost function so that the actuators move flexibly.

* * * * *

UNITED STATES PATENT AND TRADEMARK OFFICE
CERTIFICATE OF CORRECTION

PATENT NO. : 8,818,559 B2
APPLICATION NO. : 13/255775
DATED : August 26, 2014
INVENTOR(S) : Fukashi Andoh It is certified that error appears in the above-identified patent and that said Letters Patent is hereby corrected as shown below:

In the Specification

At column 2, line 55, change "independent-axis, torque" to -- independent-axis torque --.

At column 5, line 41, change "103 generates, a target" to -- 103 generates a target --.

At column 5, line 55, change "a proximity sensor. (an" to -- a proximity sensor (an --.

At column 11, line 62, change "Thus; in the case" to -- Thus, in the case --.

At column 12, math expression (20), line 4, change

" $\frac{1}{2} m_2 [l_1^2 \theta_1^2 + l_{2c}^2 (\theta_1 + \theta_2)^2 + 2 l_1 l_{2c} \theta_1 (\theta_1 + \theta_2) \cos \theta_2] + $ "

to

-- $\frac{1}{2} m_2 [l_1^2 \theta_1^2 + l_{2c}^2 (\theta_1 + \theta_2)^2 + 2 l_1 l_{2c} \theta_1 (\theta_1 + \theta_2) \cos \theta_2] + $ --.

At column 13, math expression (21), line 2, change

" $[(2\theta_1 + \theta_2) \cos \theta_2 - (2\theta_1 + \theta_2) \theta_1 \sin \theta_2]$ "

to

-- $[(2\theta_1 + \theta_2) \cos \theta_2 - (2\theta_1 + \theta_2) \theta_1 \sin \theta_2]$ --.

At column 13, math expression (21), line 3, change "+ m₀l₁) gsinθ₁ -" to -- "+ m₀l₁) g sinθ₁ - --.

At column 13, math expression (21), line 4, change "+ m₀l₂), gsin(θ₁₊ θ₂)" to
-- "+m₀l₂) g sin(θ₁₊ θ₂) + --.

Signed and Sealed this
Twenty-first Day of July, 2015

Michelle K. Lee
*Director of the United States Patent and Trademark Office*

CERTIFICATE OF CORRECTION (continued)
U.S. Pat. No. 8,818,559 B2

At column 13, math expression (22), line 2, change "+ $m_0l_2$) gsin($\theta_1$+ $\theta_2$) =" to -- + $m_0l_2$) g sin($\theta_1$+ $\theta_2$) + --.

At column 13, math expression (23), line 5, change "$l_{3c}$ [1-cos ($\theta_1$+$\theta_2$+$\theta_3$)]" to -- $l_3$ [1-cos ($\theta_1$+$\theta_2$+$\theta_3$)] --.

At column 13, math expression (24), line 3, change

" $= \frac{1}{2}(m_3 l_{3c}^2 + m_0 l_3'^2)\dot{\theta}_3^2$ ", to

-- $= \frac{1}{2}(m_3 l_{3c}^2 + m_0 l_3'^2)\dot{\theta}_3^2$ --.

At column 15, line 7, change "0.142[$N^{22}$ • $m^2$]," to -- 1.142[$N^2$ • $m^2$], --.

At column 15, line 32, change "a position. P-control" to -- a position P-control --.

At column 15, line 41, change "5.5 × $10^5$ [rad]" to -- 5.5 × $10^{-5}$ [rad] --.

At column 16, line 35, change "mechanism 110 based (step S602)," to -- mechanism 110 (step S602), --.

At column 19, line 6, change "this construction is note restrictive." to -- this construction is not restrictive. --.

In the Claims

At column 21, line 4, Claim 12, change "method comprisinG" to -- method comprising --.